US009889413B2

(12) United States Patent
Li et al.

(10) Patent No.: US 9,889,413 B2
(45) Date of Patent: Feb. 13, 2018

(54) POLYETHERIMIDE COMPOSITE NANOFILTRATION MEMBRANE AND PREPARATION METHOD THEREOF

(71) Applicant: Tianjin University, Tianjin (CN)

(72) Inventors: Wei Li, Tianjin (CN); Jinli Zhang, Tianjin (CN); Yuyan Hai, Tianjin (CN); Qian Jiang, Tianjin (CN); Ayang Zhou, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/108,577

(22) PCT Filed: Dec. 13, 2014

(86) PCT No.: PCT/CN2014/093765
§ 371 (c)(1),
(2) Date: Jun. 28, 2016

(87) PCT Pub. No.: WO2015/196753
PCT Pub. Date: Dec. 30, 2015

(65) Prior Publication Data
US 2017/0157574 A1      Jun. 8, 2017

(30) Foreign Application Priority Data

Jun. 25, 2014   (CN) .......................... 2014 1 0294149

(51) Int. Cl.
*B01D 71/64*      (2006.01)
*B01D 69/12*      (2006.01)
*B01D 61/02*      (2006.01)

(52) U.S. Cl.
CPC ............ *B01D 71/64* (2013.01); *B01D 61/027* (2013.01); *B01D 69/125* (2013.01)

(58) Field of Classification Search
CPC ....... B01D 71/64; B01D 71/56; B01D 61/027
See application file for complete search history.

(56) References Cited

U.S. PATENT DOCUMENTS

| 4,277,344 A | 7/1981 | Cadotte |
| 6,162,358 A * | 12/2000 | Li ........................ B01D 69/125 210/490 |

(Continued)

FOREIGN PATENT DOCUMENTS

| CN | 101460237 A | 6/2009 |
| CN | 102641667 A | 8/2012 |

(Continued)

OTHER PUBLICATIONS

"The preparation of polyimide membrane, and nano-filtration separation of organic system", Li Wei, et al., Chemical industry and engineering progress, vol. 26, No. 7, pp. 1012-1017, Dec. 31, 2017, Tianjin, China.

*Primary Examiner* — Alex A Rolland
(74) *Attorney, Agent, or Firm* — Bei & Ocean; George G. Wang

(57) ABSTRACT

The present invention relates to a polyetherimide composite nanofiltration membrane and a preparation method thereof, the method comprises the following steps: (1) dissolving polyetherimide and an additive into an organic solvent, stirring and keeping aside for deaeration to prepare a casting solution, blade coating of the casting solution onto a smooth surface of a nonwoven fabric, and placing under an air atmosphere and then putting into deionized water to obtain a support membrane 1, wherein the surface of the nonwoven fabric coated with the casting solution is referred to as surface A; (2) immersing the surface A of the support membrane 1 into an aqueous solution of m-phenylenediamine, taking out and drying in the air, then immersing the surface A into a solution of 1,2,4,5-benzene tetracarbonyl chloride in n-hexane or cyclohexane, and taking out and drying in the air to obtain a support membrane 2; and (3) immersing the surface A of the support membrane 2 into an aqueous solution of EDC.HCl, then adding NHS into the (Continued)

aqueous solution of EDC.HCl, then adding an aqueous solution of ethylene diamine and keeping aside, and then rinsing with deionized water to obtain a polyetherimide composite nanofiltration membrane. The method of the invention has the advantages of low cost, low energy consumption and low pollution; and also has high rejection towards low-molecular-weight compound, stable performance and a longer lifetime.

6 Claims, 1 Drawing Sheet

(56) References Cited

U.S. PATENT DOCUMENTS

| | | | |
|---|---|---|---|
| 2006/0249446 A1 | 11/2006 | Yeager | |
| 2010/0297429 A1* | 11/2010 | Wang | B01D 67/0006 428/319.3 |

FOREIGN PATENT DOCUMENTS

| | | | | |
|---|---|---|---|---|
| CN | 102794116 A | | 11/2012 | |
| CN | 103068476 A | | 4/2013 | |
| CN | 103648625 A | | 4/2013 | |
| CN | 103212312 A | | 7/2013 | |
| CN | 103260733 A | | 8/2013 | |
| CN | 103272498 A | * | 9/2013 | |
| CN | 103272498 A | | 9/2013 | |
| CN | 103648625 A | * | 3/2014 | B01D 69/02 |
| CN | 103768964 A | | 5/2014 | |

* cited by examiner

POLYETHERIMIDE COMPOSITE NANOFILTRATION MEMBRANE AND PREPARATION METHOD THEREOF

CROSS-REFERENCE TO RELATED APPLICATIONS

This application claims priority from CN Application No. CN201410294149.5, filed Jun. 25, 2014 and PCT Application No. PCT/CN2014/093765, filed Dec. 13, 2014, the contents of which are incorporated herein in the entirety by reference.

FIELD OF THE INVENTION

The invention relates to a polyetherimide composite nanofiltration membrane and a preparation method thereof.

BACKGROUND OF THE INVENTION

As a new developed separation technology, nanofiltration is a pressure-driven membrane separation process between reverse osmosis and ultrafiltration with a molecular weight cut-off (MWCO) generally in a range of 200 to 1000. Nanofiltration has been widely applied in multiple fields such as sea water desalinization, ultra-pure water preparation, food industry, pharmaceutical industry and environment protection, due to its advantages of low operation pressure, no chemical reaction occurred during the separation process, no heating requirement, and low energy consumption.

Nanofiltration membranes are mostly composite membranes and consist of a top separation layer and a porous support layer, and the interfacial polymerization method has become the most commonly-used method for preparing a composite nanofiltration membrane. A polymerization reaction is conducted on an interface of a two-phase solution, which belongs to nonreversible polymerization of a heterogeneous system and requires a monomer to have very high reaction activity. Generally, an acyl chloride monomer is dissolved in an organic solvent such as cyclohexane and n-hexane, and a monomer like diamine is dissolved in an aqueous solution; then a condensation polymerization reaction occurs between the two solutions at the surface of a porous support layer; and a polymer obtained from the reaction is adhered to the surface of the supporting layer rather than dissolved in the solvent, thereby forming a dense and active separation layer.

An acyl chloride monomer commonly used for interfacial polymerization is trimesoyl chloride, which is relatively expensive; while applications of using 1,2,4,5-benzene tetracarbonyl chloride (BTC) as a cheaper reaction monomer are fewer. In most reports, a poly(amic acid) is firstly obtained by reacting BTC with diamine on the surface of a support membrane, and then an imidization process is conducted to obtain a polyimide thin film composite membrane.

In the existing research reports, generally a thermal or chemical imidization method is used for treating the composite membrane after the interfacial polymerization. However for the two imidization processing, support membranes with thermal or solvent resistance are needed, which results in higher cost. Meanwhile, during the thermal imidization processing, the uneven heating surface of the membrane can probably occur under a continuous high temperature treatment which increased the energy consumption, thereby affecting the performance of the membrane. And during the chemical imidization, the agents such as benzene, acetic anhydride, acetone, etc. are difficult to recycle, resulting in environmental disruption, and the membrane has a larger MWCO (500-800), which restricts the utilization of the membrane.

Yaw-Terng Chern et. al. have prepared polyimide thin film composite membranes by the interfacial polymerization of BTC and 4,4'-methylene dianiline on a polysulfone support followed by thermal imidization for gas separation, and the resultant membrane showed excellent separation performance for carbon dioxide, oxygen, etc. [Yaw-Terng Chern, Leo-Wang Chen. Preparation of Composite Membranes via Interfacial Polyfunctional Condensation for Gas Separation Applications. Journal of Applied Polymer Science, 1992, 44:1087-1093.]. ZhenSheng Yang et. al. have prepared polyimide thin film composite membranes by the interfacial polymerization of BTC and m-phenylenediamine (MPD) on an acrylamide grafted polypropylene ultrafiltration membrane followed by chemical imidization, and the resultant membrane exhibits the rejection of 96.9%, 91.2% and 72.6% and the flux of 8.9 L/($m^2 \cdot h$), 9.1 L/($m^2 \cdot h$) and 9.2 L/($m^2 \cdot h$) for acid brilliant blue 6B (with a molecular weight of 825.97), acid red 4B (with a molecular weight of 502.44) and basic brilliant blue 6B (with a molecular weight of 506.13) respectively. [Zhen-Sheng Yang, Lei Zhang, Guang-Hou Zhang, Chun-Li Li, Preparation and Characterization of PI/PP Solvent Resistant Nanofiltration Composite Membrane via Interfacial Polymerization, Journal of Chemical Industry and Engineering(China), 2012, 63(8): 2635-2641.] SungPyo Hong et. al. have prepared polyimide thin film composite membranes by the interfacial polymerization of BTC and m-phenylenediamine (MPD) on a polysulfone support followed by thermal imidization, and the resultant membrane exhibits a rejection of 96.7% and a flux of 23.6 L/($m^2 \cdot h$) for NaCl at 1.5 MPa. [SungPyo Hong, In-Chul Kim, Taemoon Tak, Young-Nam Kwon. Interfacially synthesized chlorine-resistant polyimide thin film composite (TFC) reverse osmosis (RO) membranes. Desalination, 2013, 309: 18-26.]

To solve the existing problems of high energy consumption, environmental pollution and low rejection (especially for a compound with a molecular weight of 150 to 200) during the imidization process for nanofiltration membranes preparation, it is urgent to explore a novel method for preparing a composite nanofiltration membrane with an excellent performance.

SUMMARY OF THE INVENTION

An object of the invention is to provide a polyetherimide composite nanofiltration membrane which can overcome the disadvantages of the prior art.

The second object of the invention is to provide a method for preparing a polyetherimide composite nanofiltration membrane.

The technical solution of the invention is summarized as follows:

A method for preparing a polyetherimide composite nanofiltration membrane, including the following steps:

(1) dissolving polyetherimide with a molecular weight at a range from 35000 to 55000 and an additive into an organic solvent in a manner that the weight percentage of the polyetherimide is at a range from 15% to 27% and the weight percentage of the additive is at a range from 1% to 6%, stirring at a temperature range from 40 to 80° C. for 3 to 8 hours and then keeping aside for deaeration for 8 to 24 hours to prepare a casting solution, blade coating at a range from 12 g to 20 g of the casting solution onto a smooth surface of a nonwoven fabric of 20 cm×30 cm according to a certain proportion, placing under an air atmosphere for 0 to 60 seconds and putting into deionized water for 5 to 60 min of immersion, taking out and drying in the air to obtain a support membrane 1, wherein the surface of the nonwoven fabric coated with the casting solution is referred to as surface A;

(2) immersing the surface A of the support membrane 1 into an aqueous solution of m-phenylenediamine (MPD) with a weight percentage at a range from 0.5% to 4% for 30 to 120 seconds, taking out and drying in the air, then immersing the surface A into a solution of 1,2,4,5-benzene tetracarbonyl chloride (BTC) in n-hexane or cyclohexane with a weight percentage at a range from 0.02% to 0.2% for 30 to 120 seconds, and taking out and drying in the air to obtain a support membrane 2; and (3) immersing the surface A of the support membrane 2 into an aqueous solution of EDC.HCl with a weight percentage at a range from 4% to 8% for 10 to 20 min, then adding NHS into the aqueous solution of EDC.HCl to obtain a weight percentage at a range from 2% to 4%, shaking to dissolve NHS, then adding an aqueous solution of ethylene diamine with a weight percentage at a range from 2% to 8%, keeping aside to react for 4 to 16 hours, and then rinsing with deionized water to obtain a polyetherimide composite nanofiltration membrane, wherein the volume ratio of the aqueous solution of ethylene diamine to the aqueous solution of EDC.HCl is 1:1, wherein EDC.HCl is an abbreviation of 1-(3-dimethylamino propyl)-3-ethylcarbodiimide hydrochloride, NHS is an abbreviation of N-hydroxysuccinimide.

The additive is preferably selected from polyethylene glycol 200, polyethylene glycol 400, or polyvinylpyrrolidone.

The organic solvent is preferably selected from N,N-dimethyl formamide, N,N-dimethyl acetamide or N-methyl pyrrolidone.

The material of the nonwoven fabric is preferably selected from polypropylene, polyester or polyacrylonitrile.

The weight percentage of the polyetherimide in step (1) is preferably 25%.

The weight percentage of the additive in step (1) is preferably 2%.

The placement time under the air atmosphere in step (1) is preferably at a range from 1 to 10 seconds.

A polyetherimide composite nanofiltration membrane prepared by using the aforementioned method is disclosed above.

The present invention has the advantageous in that:

1. The method of the invention selects BTC for the interfacial polymerization on the polyetherimide support membrane, which reduces the cost;

2. The invention has the advantage of low energy consumption and low pollution through the modification treatment of the membrane surface;

3. The polyetherimide composite nanofiltration membrane prepared by the method of the invention has relatively high rejection (greater than 90%) for some compounds with low molecular weights (150 to 200), and has a stable performance and a longer lifetime; and 4. The process is simple, the reaction conditions are mild, and the reaction time is short.

DETAILED DESCRIPTION OF PARTICULAR EMBODIMENTS OF THE INVENTION

Figure 1:
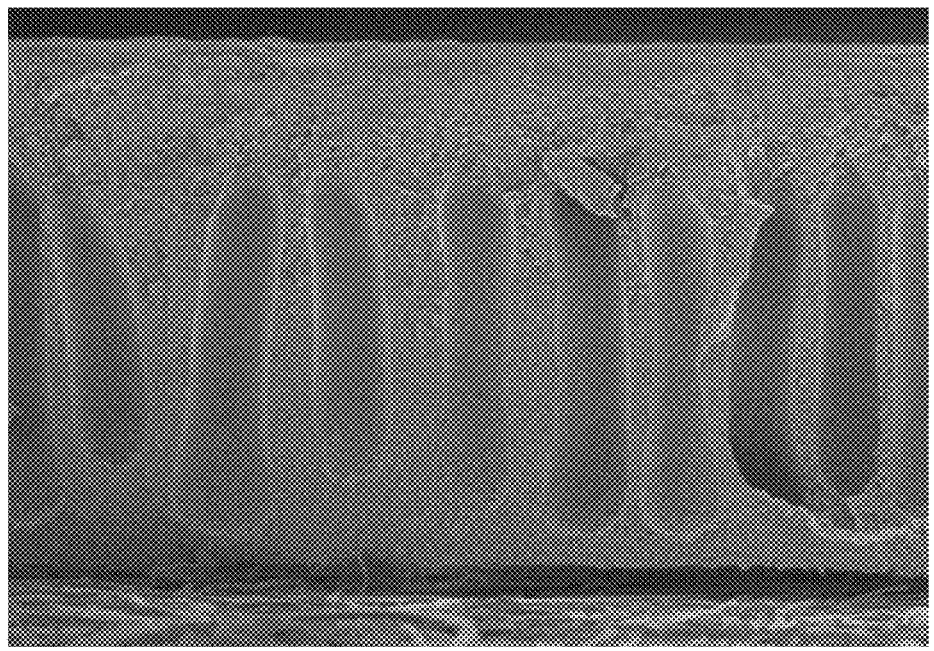
FIG. 1 shows a cross-sections structure of a polyetherimide composite nanofiltration membrane prepared by a method of the invention.
Figure 2:
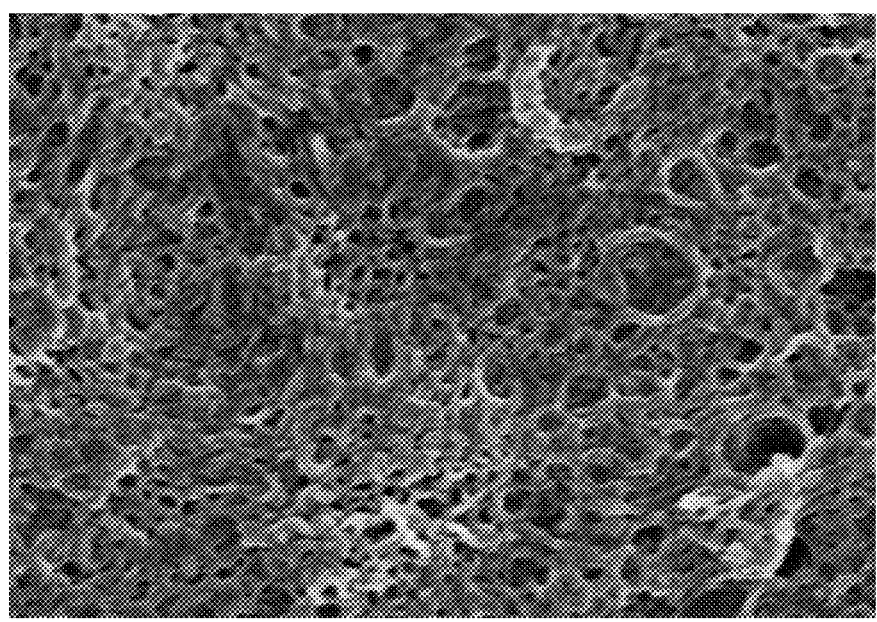
FIG. 2 shows a top surface structure of the polyetherimide composite nanofiltration membrane prepared by the method of the invention.

The invention is further described in connection with specific embodiments hereafter, and the embodiments of the invention are only provided for better understanding the invention by those skilled in the art, without any limitation to the invention.

Glucose is used in a separation performance experiment of the membrane, with the test conditions of 25° C. and a glucose concentration of 10 g/L in each embodiment.

In each embodiment, EDC.HCl is an abbreviation of 1-(3-dimethylamino propyl)-3-ethylcarbodiimide hydrochloride, and NHS is an abbreviation of N-hydroxysuccinimide.

Embodiment 1

A method for preparing a polyetherimide composite nanofiltration membrane, including the following steps:

(1) dissolving polyetherimide with a molecular weight of 35000 and polyethylene glycol 200 into N,N-dimethyl acetamide in a manner that the weight percentage of the polyetherimide is 15% and the weight percentage of polyethylene glycol 200 is 6%, stirring at 80° C. for 3 hours and then keeping aside for deaeration for 24 hours to prepare a casting solution, blade coating 12 g of the casting solution onto a smooth surface of a nonwoven fabric of 20 cm×30 cm according to a certain proportion, putting into deionized water for 60 min of immersion, taking out and drying in the air to obtain a support membrane 1, wherein the surface of the nonwoven fabric coated with the casting solution is referred to as surface A;

(2) immersing the surface A of the support membrane 1 into an aqueous solution of m-phenylenediamine (MPD) with a weight percentage of 0.5% for 30 seconds, taking out and drying in the air, then immersing the surface A into a solution of 1,2,4,5-benzene tetracarbonyl chloride (BTC) in n-hexane with a weight percentage of 0.02% for 30 seconds, and taking out and drying in the air to obtain a support membrane 2; and (3) immersing the surface A of the support membrane 2 into an aqueous solution of EDC.HCl with a weight percentage of 4% for 10 min, then adding NHS into the aqueous solution of EDC.HCl to obtain a weight percentage of 2%, shaking to dissolve NHS, then adding an aqueous solution of ethylene diamine with a weight percentage of 2%, keeping aside to react for 16 hours, and rinsing with deionized water to obtain a polyetherimide composite nanofiltration membrane, wherein the volume ratio of the aqueous solution of ethylene diamine to the aqueous solution of EDC.HCl is 1:1.

The flux of the resultant membrane is 28.1 L h$^{-1}$ m$^{-2}$, the rejection is 90.6% for filtration of a glucose solution with a concentration of 10 g/L, and the operation pressure is 1 MPa.

The experimental results prove that by using the same conditions as this embodiment except that the solution of BTC in n-hexane used in this embodiment is replaced by a solution of BTC in cyclohexane, a polyetherimide composite nanofiltration membrane with the similar performance of this embodiment can be obtained.

Embodiment 2

A method for preparing a polyetherimide composite nanofiltration membrane, including the following steps:

(1) dissolving polyetherimide with a molecular weight of 48000 and polyethylene glycol 400 into N,N-dimethyl formamide in a manner that the weight percentage of the polyetherimide is 27% and the weight percentage of polyethylene glycol 400 is 1%, stirring at 40° C. for 8 hours and then keeping aside for deaeration for 8 hours to prepare a casting solution, blade coating 16 g of the casting solution onto a smooth surface of a nonwoven fabric of 20 cm×30 cm according to a certain proportion, placing under an air atmosphere for 60 seconds and putting into deionized water for 5 min of immersion, taking out and drying in the air to obtain a support membrane 1, wherein the surface of the nonwoven fabric coated with the casting solution is referred to as surface A;

(2) immersing the surface A of the support membrane 1 into an aqueous solution of MPD with a weight percentage of 4% for 60 seconds, taking out and drying in the air, then immersing the surface A into a solution of BTC in cyclohexane with a weight percentage of 0.2% for 60 seconds, and taking out and drying in the air to obtain a support membrane 2; and (3) immersing the surface A of the support membrane 2 into an aqueous solution of EDC.HCl with a weight percentage of 8% for 15 min, then adding NHS into the aqueous solution of EDC.HCl to obtain a weight percentage of 4%, shaking to dissolve NHS, then adding an aqueous solution of ethylene diamine with a weight percentage of 8%, keeping aside to react for 4 hours, and rinsing with deionized water to obtain a polyetherimide composite nanofiltration membrane, wherein the volume ratio of the aqueous solution of ethylene diamine to the aqueous solution of EDC.HCl is 1:1.

The flux of the resultant membrane is 15.5 L h$^{-1}$ m$^{-2}$, the rejection is 98.7% for filtration of a glucose solution with a concentration of 10 g/L, and the operation pressure is 1 MPa.

Embodiment 3

A method for preparing a polyetherimide composite nanofiltration membrane, including the following steps:

(1) dissolving polyetherimide with a molecular weight of 55000 and polyvinylpyrrolidone into N-methyl pyrrolidone in a manner that the weight percentage of the polyetherimide is 25% and the weight percentage of polyvinylpyrrolidone is 2%, stirring at 60° C. for 5 hours and then keeping aside for deaeration for 12 hours to prepare a casting solution, blade coating 20 g of the casting solution onto a smooth surface of a nonwoven fabric of 20 cm×30 cm according to a certain proportion, placing under an air atmosphere for 10 seconds and putting into deionized water for 30 min of immersion, taking out and drying in the air to obtain a support membrane 1, wherein the surface of the nonwoven fabric coated with the casting solution is referred to as surface A;

(2) immersing the surface A of the support membrane 1 into an aqueous solution of MPD with a weight percentage of 2% for 120 seconds, taking out and drying in the air, then immersing the surface A into a solution of BTC in n-hexane with a weight percentage of 0.1% for 120 seconds, and taking out and drying in the air to obtain a support membrane 2; and (3) immersing the surface A of the support membrane 2 into an aqueous solution of EDC.HCl with a weight percentage of 6% for 20 min, then adding NHS into the aqueous solution of EDC.HCl to obtain a weight percentage of 3%, shaking to dissolve NHS, then adding an aqueous solution of ethylene diamine with a weight percentage of 6%, keeping aside to react for 8 hours, and rinsing with deionized water to obtain a polyetherimide composite nanofiltration membrane, wherein the volume ratio of the aqueous solution of ethylene diamine to the aqueous solution of EDC.HCl is 1:1.

The flux of the resultant membrane is 27.8 L h$^{-1}$ m$^{-2}$, the rejection is 91.2% for filtration of a glucose solution with a concentration of 10 g/L, and the operation pressure is 1 MPa.

The experimental results prove that by using the same conditions as this embodiment except that the placement time of 10 seconds under the air atmosphere as used in step (1) of this embodiment is replaced by a placement time of 1 second under the air atmosphere, a polyetherimide composite nanofiltration membrane with the similar performance of this embodiment can be obtained.

What is claimed is:

1. A method for preparing a polyetherimide composite nanofiltration membrane, comprising the following steps:

(1) dissolving polyetherimide with a molecular weight at a range from 35000 to 55000 and an additive into an organic solvent in a manner that the weight percentage of the polyetherimide is at a range from 15% to 27% and the weight percentage of the additive is at a range from 1% to 6%, stirring at a temperature ranges from 40 to 80° C. for 3 to 8 hours and then keeping aside for deaeration for 8 to 24 hours to prepare a casting solution, blade coating at a range from 12 g to 20 g of the casting solution onto a smooth surface of a nonwoven fabric of 20 cm×30 cm according to a certain proportion, placing under an air atmosphere for 0 to 60 seconds and putting into deionized water for 5 to 60 min of immersion, taking out and drying in the air to obtain a support membrane 1, wherein the surface of the nonwoven fabric coated with the casting solution is referred to as surface A;

(2) immersing the surface A of the support membrane 1 into an aqueous solution of m-phenylenediamine with a weight percentage at a range from 0.5% to 4% for 30 to 120 seconds, taking out and drying in the air, then immersing the surface A into a solution of 1,2,4,5-benzene tetracarbonyl chloride in n-hexane or cyclohexane with a weight percentage at a range from 0.02% to 0.2% for 30 to 120 seconds, and taking out and drying in the air to obtain a support membrane 2; and (3) immersing the surface A of the support membrane 2 into an aqueous solution of EDC.HCl with a weight percentage at a range from 4% to 8% for 10 to 20 min, then adding NHS into the aqueous solution of EDC.HCl to obtain a weight percentage at a range from 2% to 4%, shaking to dissolve NHS, then adding an aqueous solution of ethylene diamine with a weight percentage at a range from 2% to 8%, keeping aside to react for 4 to 16 hours, and rinsing with deionized water to obtain a polyetherimide composite nanofiltration membrane, wherein the volume ratio of the aqueous solution of ethylene diamine to the aqueous solution of EDC.HCl is 1:1, the EDC.HCl is an abbreviation of 1-(3-dimethylamino propyl)-3-ethylcarbodiimide hydrochloride, and NHS is an abbreviation of N-hydroxysuccinimide;

wherein the additive is selected from polyethylene glycol 200, polyethylene glycol 400, or polyvinylpyrrolidone.

2. The method as claimed in claim 1, wherein the organic solvent is selected from N,N-dimethyl formamide, N,N-dimethyl acetamide or N-methyl pyrrolidone.

3. The method as claimed in claim 1, wherein the material of the nonwoven fabric is selected from polypropylene, polyester or polyacrylonitrile.

4. The method as claimed in claim 1, wherein the weight percentage of the polyetherimide in step (1) is 25%.

5. The method as claimed in claim 1, wherein the weight percentage of the additive in step (1) is 2%.

6. The method as claimed in claim 1, wherein the placement time under the air atmosphere in step (1) is 1-10 seconds.

* * * * *